United States Patent Office 3,449,320
Patented June 10, 1969

3,449,320
HEXACHLOROBUTADIENE POLYOL COMPOUNDS
Robert J. Knopf, St. Albans, W. Va., assignor to Union Carbide Corporation, a corporation of New York
No Drawing. Filed Apr. 21, 1966, Ser. No. 544,116
Int. Cl. C07c *47/18, 31/18;* C08g *23/24*
U.S. Cl. 260—209                11 Claims

ABSTRACT OF THE DISCLOSURE

Polyols are prepared by reacting hexachlorobutadiene with the reaction product of a base and a polyhydroxy composition such as a polyhydroxyalkane or an alkylene oxide adduct thereof. The polyols can be reacted with organic polyisocyanates to form urethane polymers of enhanced utility owing to the flame retardance properties imparted by the polyols.

---

The invention relates to polyols that are derived from hexachlorobutadiene and to urethane polymers that are derived therefrom. In a particular aspect, the invention relates to polyols that can be produced by reacting hexachlorobutadiene with certain polyhydroxy materials, and to the urethane polymers derived therefrom.

The polyol compositions of the invention are produced by reacting hexachlorobutadiene with a polyhydroxy composition in the presence of a base which acts as an acid acceptor. While the resulting polyols can be a complex mixture of compositions, the nature of the polyols, and the reaction used to form them, are illustrated by the following reaction where $R(OH)_x$ represents a polyhydroxy composition:

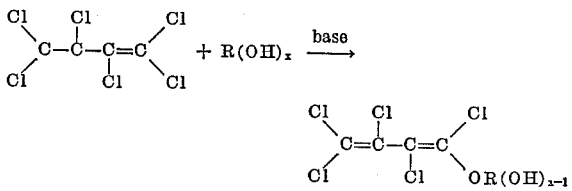

The polyhydroxy compositions that can be employed to produce the polyols of the invention are those that are not readily attacked by the base under the reaction conditions required. For instance, polyhydroxyalkanes, polyhydroxyamines, ethers and polyethers having two or more hydroxyl groups, sulfones and sulfides having two or more hydroxyl groups, glycosides and polyether derived therefrom, polyhydric phenols and other polyhydroxy aromatic compounds, and the like. Organic groups to be avoided in the polyhydroxy composition include ester, amide, aliphatic halide, aliphatic nitro, carboxylic acid and aldehyde groups. One or more of the hydroxyl groups of the polyhydroxy composition can be replaced with mercapto groups.

Specific illustrative examples of polyhydroxy compositions that can be used in the invention include ethylene glycol, propylene glycol, butylene glycol, 2,5-pentanediol, glycerol, 1,2,6-hexanetriol, 1,1,1-trimethylolpropane pentaerythritol, sorbitol, 2-mercaptoethanol, and alkylene oxide adducts thereof, especially the ethylene oxide, propylene oxide, or butylene oxide adducts thereof. Also useful are polyalkylene glycols such as diethylene glycol, dipropylene glycol, tripropylene glycol, high molecular weight polyethylene, polypropylene, and polybutylene glycols, and the like. Amine-containing polyhydroxy compositions are useful. Illustrative amines include triethanolamine, triisopropanolamine, ethylene oxide, propylene oxide, or butylene oxide adducts of ethylenediamine, diethylenetriamine, diaminobenzene and diaminotoluene, bis(para-aminophenyl) sulfone, 1,2-propylenediamine, and the like. Additional useful polyhydroxy compositions includes alpha-methylglucoside, alkylene glycolglucosides, other glycosides and alkylene oxide adducts thereof, sucrose and alkylene oxide adducts thereof, bis(2-hydroxyethyl) sulfone, bis(2-hydroxyethyl) sulfide, 1,3-bis(hydroxymethyl)benezene, bis(4-hydroxyphenyl)methane, novolac resins, alkylene oxide adducts of the above, and the like.

It is apparent from the foregoing that many types of polyhydroxy compositions can be employed to produce the polyols of the invention. The compositions can be monomeric compounds or they can be polymeric compounds such as the polyethers exemplified above. In general, the polyhydroxy composition will have a molecular weight of not more than about 5000, preferably not more than about 3000, and more preferably not more than about 1000.

The reaction between hexachlorobutadiene and the polyhydroxy composition is carried out in the presence of a base which acts as an acid acceptor. The preferred base is an alkali metal alkoxide of the polyhydroxy composition, although other types of bases can be employed. The manner in which the base is employed can be illustrated by the following equations wherein HO—R—OH represents a diol:

(1)  $HO-R-OH + NaOH \rightarrow NaO-R-OH + H_2O$ (2)

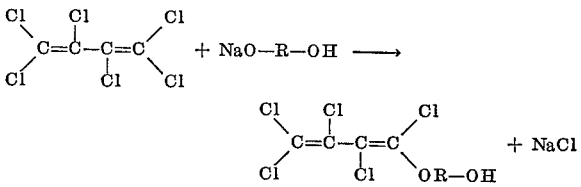

It is preferred in some cases that reaction (1), above, be carried out before the hexachlorobutadiene is added to the reaction mixture in order to avoid undesired side reactions between the sodium hydroxide and hexachlorobutadiene. It is also preferred to remove the water from the reaction mixture before adding the hexachlorobutadiene because the reaction of alkali metal hydroxide with alcohol to form alkoxide and water is reversible. Water removal can conveniently be effected by azeotropic distillation with, for example, toluene or other hydrocarbon. It must be emphasized, however, that it is not essential to pre-react the base with the polyhydroxy composition. The reaction can be carried out by charging all of the reactants together.

The base can be an alkali metal or an alkali metal hydroxide such as lithium, sodium, potassium, lithium hydroxide, sodium hydroxide, potassium hydroxide, and the like. Other bases that can be employed include sodium carbonate, quaternary ammonium hydroxides, and the like. As was indicated above, it is preferred to pre-react the base with the polyhydroxy composition (and to simultaneously remove water or other condensation product) before the hexachlorobutadiene is added to the reaction mixture.

A major utility of the polyols of the invention is as flame-proofing additives. For this reason it is desired that the polyol have as high a chlorine content as possible. To accomplish this purpose, it is preferred to replace as few of the hexachlorobutadiene chlorine atoms as possible, for instance, not more than an average of three, and preferably, an average of from one to two. As a general rule about one equivalent of chlorine atom will be replaced per equivalent of base. Therefore, by using from about one to about three equivalents of base per mole of hexachlorobutadiene, the desired degree of replacement of chlorine will be achieved. Other proportions of base can be employed, if desired, for instance, from about one-half, or less, to about six equivalents of base per mole of hexachlorobutadiene can be employed. The proportion of polyhydroxy composition used is dependent upon the functionality of the polyhydroxy composition (i.e., the average number of hydroxy groups per molecule), the intended use for the polyol, and the like. The polyhydroxy composition is normally employed in proportions such that the polyhydroxy composition contains at least two equivalents of hydroxyl groups (prior to conversion of hydroxyl to alkali metal alkoxide) per mole of hexachlorobutadiene, preferably at least three, and more preferably at least four, equivalents of hydroxyl per mole of hexachlorobutadiene. Lower proportions of polyhydroxy composition can also be used, although this would be undesired because there would be too much hexachlorobutadiene left unreacted which would be an uneconomical way to carry out the invention. Nevertheless, the polyhydroxy composition can be employed in an amount such that there is one, and less, equivalent of hydroxyl, up to as much as twenty or more equivalents of hydroxyl, per mole of hexachlorobutadiene.

A preferred method for carrying out the reaction is to first react the polyhydroxy composition with the base, removing any water formed in the process by azeotropic distillation in benzene, toluene, or the like, and to then react the alkoxide with hexachlorobutadiene to form the polyols of the invention. Alternatively, the alkoxide can be formed in situ by reaction of base with polyhydroxy composition in the presence of hexachlorobutadiene. It is again desirable to include an azeotroping agent in the reaction mixture to remove water. The mode and order of addition of hexachlorobutadiene and alkoxide is not critical.

The reaction between alkoxide and hexachlorobutadiene is carried out at elevated temperatures, for instance, from about 35° to 200° C., preferably from about 45° to 135° C., and more preferably from about 55° to 100° C. The reaction is continued for a period of time sufficient to produce the polyols of the invention. The exact time varies with factors such as temperature, nature and proportion of reactants, and the like. It is preferred to continue the reaction until the base is consumed by forming the chloride salt thereof. Progress of the reaction can be followed by conventional means such as periodic determination of pH, refractive index, vapor phase chromatographic analysis, or the like. In general, the reaction time will be of the order of from about one to twenty hours.

It is desirable, although not essential, to carry out the reaction in an inert organic diluent. It is convenient to utilize as the reaction medium the azeotroping agent that was employed in making the alkali metal alkoxide (whether the alkoxide is made separately or in situ). Useful diluents include benzene, toluene, xylene, heptane, and the like. Conventional reaction equipment can be used for the reaction, which is preferably carried out at atmospheric pressure although higher or lower pressures can be used.

The polyol product can be recovered by standard procedures. For instance, diluent and volatile unreacted starting material can be removed by distillation. The residue product can then be diluented with acetone, filtered to remove chloride salt, and then stripped of acetone solvent. If desired, the acetone solution can also be ion-exchanged after filtration to reduce the salt content to a much lower value than is possible by filtration.

In a desirable embodiment of the invention, the polyols are used to produce urethane polymers. The urethane polymers of the invention are produced by reacting an organic polyisocyanate with a polyol of the invention, either alone or in combination with one or more polyols. Many oragnic polyisocyanates can be employed for this purpose, including 2,4-tolylene diisocyanate, 2,6-tolylene diisocyanate, crude tolylene diisocyanate, bis(4-isocyanatophenyl)methane, polyphenylmethylene polyisocyanates that are produced by phosgenation of aniline-formaldehyde condensation products, dianisidine diisocyanate, bitolylene diisocyanate, xylylene diisocyanate, naphthalene diisocyanate, hexamethylene diisocyanate, bis(2 - isocyanatoethyl) fumarate, bis(2 - isocyanatoethyl) carbonate, and many other organic polyisocyanates that are known in the art, such as those that are disclosed in an article by Siefken, Ann., 562, 75 (1949). In general, the aromatic polyisocyanates are preferred because of their greater reactivity.

In producing the urethane polymers of the invention, one or more polyols in addition to the polyols of the invention can be employed in the reaction with the organic polyisocyanate. Such additional polyols that can be employed are exemplified by the following classes of compositions:

(a) Polyoxyalkylene polyols including alkylene oxide adducts of, for example, water, ethylene glycol, diethylene glycol, propylene glycol, dipropylene glycol, glycerol, 1,2,6 - hexanetriol, 1,1,1 - trimethylolethane, 1,1,1 - trimethylolpropane, pentaerythritol, sorbitol, sucrose, lactose, alpha - methylglucoside, alpha - hydroxyalkylglucoside, ammonia, triethanolamine, triisopropanolamine, ethylenediamine, diethylenetriamine, novolac resins, phosphoric acid, benzene phosphonic acid, polyphosphoric acids such as tripolyphosphoric acid and tetrapolyphosphoric acid, phenol-aniline-formaldehyde ternary condensation products, anilineformaldehyde condensation products, and the like, are useful. The alkylene oxide employed in producing polyoxyalkylene polyols normally have from 2 to 4 carbon atoms. Propylene oxide and mixtures of propylene oxide with ethylene oxide are preferred.

(b) Polyesters of polyhydric alcohols and polycaboxylic acid such as those prepared from an excess of ethylene glycol, propylene glycol, 1,1,1-trimethylolpropane, glycerol, or the like reacted with phthalic acid, adipic acid, and the like, are useful polyols.

(c) Lactone polyols prepared by reacting a lactone such as epsilon-caprolactone or a mixture of epsilon-caprolactone and an alkylene oxide with a polyfunctional initiator such as a polyhydric alcohol, an amine, or an aminoalcohol, are also useful.

(d) Phosphorus-containing derivatives such as tris(dipropylene) glycol phosphite and other phosphites are useful in urethane foams.

The foregoing are merely illustrative of the many polyols that can be employed in conjunction with the hydroxyl-containing substituted cyclopentadienes of the invention.

The polyol or polyol mixture employed can have hydroxyl numbers which vary over a wide range. In general, the hydroxyl numbers of the polyols employed in the invention can range from about 20, and lower, to about 800, and higher, preferably, from about 30 to about 700, and more preferably from about 35 to about 600. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where

OH = hydroxyl number of the polyol
$f$ = average functionality, that is average number of hydroxyl groups per molecule of polyol
M.W. = average molecular weight of the polyol.

The exact polyol employed depends upon the end-use of the urethane product. For example, when used to prepare foams, the molecular weight and the hydroxyl number are selected properly to result in flexible, semi-flexible, or rigid foams. The polyol preferably possesses an average hydroxyl number of from about 250 to about 600 when employed in rigid foam formulations, from about 70 to about 200 for semi-flexible foams, and from about 35 to about 65 or more when employed in flexible foam formulations. Such limits are not intended to be restrictive, but are merely illustrative of the large number of possible combinations of the polyols that can be employed.

The urethane polymers of the invention can take the form of foamed products, elastomers, surface coatings, castings, and the like. The foamed products can be produced, for example, by the one-shot technique wherein all of the reactants are reacted simultaneously with the foaming operation. Also, the quasi-prepolymer technique can be used to produce foams. In this technique, the isocyanate is first reacted with a portion of the polyol to give a product having a high percentage of free-NCO groups (e.g., from 20 to 50 percent), and this product is subsequently foamed by reaction with polyol and foaming agent. In producing elastomers and castings, the prepolymer technique is useful. In the prepolymer technique, the isocyanate is reacted with a slightly less than stoichiometric quantity of polyol to produce a prepolymer having a low percentage (e.g., from 1 to 10 percent) of free-NCO groups. The prepolymer is subsequently converted into an elastomer by reacting with a cross-linking agent having reactive hydrogen atoms such as a diamine, for instance, a bis(aminochlorophenyl)methane. In producing surface coatings, there are several types of known reaction techniques which can be employed. The following are representative:

(1) Use of a prepolymer having a low percentage of free-NCO that is cured by atmospheric moisture;

(2) A two-component system in which a prepolymer is mixed with a polyol just before application;

(3) A one-package system comprising two ingredients and requiring a heat cure. One of the ingredients is a polyisocyanate prepolymer in which the free-NCO groups have been blocked (e.g., with phenol) to make the isocyanate groups non-reactive until unblocked by heat. The second ingredient is a polyol.

(4) A one component system containing no free isocyanate. Unsaturated fatty acid diglycerides are reacted with polyisocyanate to cross-link the ester chains. Cure occurs through conventional oxidative drying of the fatty acid chains.

The amount of polyisocyanate employed will vary slightly depending upon the nature of the polyurethane being prepared. In general the total —NCO equivalent to total active hydrogen equivalent (i.e., hydroxyl plus water, if water is present) should be such as to provide a ratio of about 1 to 1.3 equivalents of —NCO per equivalent of active hydrogen, and preferably a ratio of about 1.05 to 1.1 equivalents of —NCO per reactive hydrogen.

When foams are being produced, foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive hydrogen reaction, or by a combination of the two methods. All of these methods are known in the art. The preferred blowing agents are water and certain halogen-substituted aliphatic hydrocarbon which have boiling points between about $-40°$ C., and $70°$ C., and which vaporize at or below the temperature of the foaming mass. Illustrative are, for example, trichloromonofluoromethane, dichlorodifluoromethane, dichloromonofluoromethane, dichloromethane, chlorodifluoromethane, 1,1-dichloro-1-fluoroethane, chloropentafluoroethane, 1,1,2-trichloro-1,2,2-trifluoroethane, 2-chloro-1,1,1,2,3,3,4,4,4-nonafluorobutane, and the like. Other useful blowing agents include low-boiling hydrocarbons such as butane, hexane, cyclohexane, and the like. Many other compounds easily volatilized by the exotherm of the isocyanate-reactive hydrogen reaction also can be employed. A further class of blowing agents includes thermally-unstable compounds which liberate gases upon heating, such as N,N'-dimethyldinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 moles of gas are used to provide densities ranging from 30 to 1 pounds per cubic foot respectively.

Catalysts are preferably employed in the reaction mixture for accelerating the isocyanate-reactive hydrogen reaction. Such catalysts include a wide variety of compounds. Among the most useful catalysts are the tertiary amines and the organic tin compounds. Specific illustrative tertiary amines include N-methylmorpholine, N-ethylmorpholine, N,N,N',N'-tetramethyl-1,3-butanediamine, N,N - dimethylethanolamine, 1,4 - diazabicyclo[2.2.2]octane bis[2 - (N,N-dimethylamino)ethyl] ether, and the like. Useful organic tin compounds include stannous octoate, stannous acetate, stannous oleate, dibutyltin diacetate, dibutyltin dilaurate, and the like. Many combinations of catalyst can be employed, for instance, it is useful to employ one or two tertiary amines in combination with stannous octoate (in making flexible foams) or dibutyltin dilaurate (in making rigid foams). The catalyst is employed in catalytic amounts such as from about 0.05 weight percent to about 6 weight percent, based on weight of polyol.

When producing urethane foams, it is useful in many cases to employ a surfactant which serves as a stabilizer in making flexible foams and as a cell size regulator in making rigid foams. Polysiloxane-polyoxyalkylene block copolymers are useful surfactants for this purpose. Among the polysiloxane-polyoxyalkylene block copolymers that are useful are those that are disclosed in U.S. Patents 2,834,748 and 2,917,480 (Bailey et al.) and 2,846,458 (Haluska). The surfactant is normally employed in amounts of from about 0.01 to about 2 weight percent, based on weight of polyol.

An excellent summary of urethane polymer chemistry and technology is found in the text by Saunders and Frisch, "Polyurethanes: Chemistry and Technology," Interscience Publishers, New York. Part I, "Chemistry," was published in 1963 and Part II, "Technology," in 1964.

The subject invention is widely useful. For instance, the polyols that are provided by the invention can be employed in producing polyester resins, they can be employed as epoxy resin hardeners, they can be esterified with drying oil acids to make surface coating compositions, they can be employed as surfactants, and they are widely useful as reaction intermediates. The urethane polymers of the invention can be employed as elastomers, rigid and flexible foams, coatings, and the like. The wide utility as gaskets, sealers, in insulation, cushions and padding, in paints, and the like, of such urethane polymers is well known.

The examples which follow illustrate the invention. In the examples, the materials employed included the following:

POLYOLS

Polyol A—Propylene oxide adduct of alpha-methylglucoside having a hydroxyl number of 436.

Polyol B.—Propylene oxide adduct of sorbitol having a hydroxyl number of 490.

Polyol C—Propylene oxide adduct of sucrose having a hydroxy number of 435.

Polyol D—An 80/20 propylene oxide/ethylene oxide adducts of a phenol-aniline-formaldehyde ternary condensation product. The adduct had a hydroxyl number of 320.

Polyol E—Propylene oxide adduct of pentaerythritol having a hydroxyl number of 564.

PHOSPHORUS POLYOLS

Phosphorus Polyol A—Dipropylene glycol pentol phosphite prepared as described in U.S. Patent No. 3,081,331, having a hydroxyl number of 285.

Phorphorus Polyol B—Propylene oxide adduct of tetrapolyphosphoric acid having a hydroxyl number of 350.

Phosphorus Polyol C—Tris(dipropylene glycol) phosphite.

Phosphorus Polyol D — O,O'-diethyl N,N-bis(2-hydroxyethyl)aminomethylphosphonate having a hydroxyl number of 455.

ISOCYANATES

Polyisocyanate A—Produced by phosgenation of the condensation product of aniline and formaldehyde. Polyisocyanate A has an isocyanate equivalent weight of about 133–138 and an average molecular weight of about 340–400.

Isocyanate B—Isocyanate A containing 1.5 weight percent of the surfactant described below.

SURFACTANT

Surfactant A—A polysiloxane-polyoxyalkylene block copolymer of the formula:

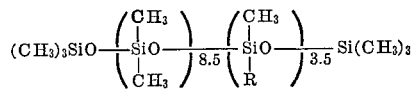

wherein R represents

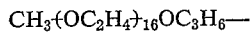

QUASI-PREPOLYMERS

Quasi A—A mixture of: 46.5 weight percent of Isocyanate A, 46.5 weight percent of a reaction product of 65 parts by weight of tolylene diisocyanate and 35 parts of Phosphorus Polyol B, 5.8 weight percent of tris(2-chloroethyl) phosphite, 1.0 weight percent Surfactant A, and 0.09 weight percent benzoyl chloride (Free NCO content was 25.6 percent).

Quasi B—Reaction product of Isocyanate A and 2,3-dibromopropanol have a free NCO content of 24.2 percent and a bromine content of 9.0 percent.

POLYOL BLEND

Polyol Blend A—A mixture of 88 parts of Polyol B, 12 parts of the propylene oxide adduct of diethylene triamine having a hydroxyl number of 700, 2.5 parts of glycerol, 1.2 parts of 33 weight percent 1,4-diazabicyclo[2.2.2]octane in dipropylene glycol, 0.2 part of phenothiazine, 0.35 part of N,N'-tetramethyl-1,3-butanediamine.

Example 1

To a 5-liter glass kettle equipped with a thermometer, decanting still head, and stirrer was charged to a mixture of 2683 g. (20.0 moles) of dipropylene glycol, 164 g. (4.1 moles) of sodium hydroxide pellets in 174 g. of water and 1 liter of toluene. At a temperature of 80–90° C. and a pressure of 300–400 mm., the system was freed of contained water and water of reaction by azeotropic distillation with toluene, the toluene phase being returned continuously to the kettle. To the alkoxide solution thus obtained was added at room temperature 522 g. (2.0 moles) of hexachlorobutadiene. The temperature was then raised slowly until the reaction commenced at about 50° C., after which the temperature was maintained at 58–60° C. for about 6–7 hours. The system was stripped free of toluene at reduced pressure and was subsequently stripped free of unreacted hexachlorobutadiene and dipropylene glycol at full pump vacuum to a maximum kettle temperature of 130° C. In this manner there were obtained 2316 grams of strippings shown by analysis to contain 144 g. of hexachlorobutadiene, which corresponds to a 72.3 percent conversion. The viscous residue product from the stripping was diluted with acetone, filtered to remove by-product sodium chloride and restripped to yield 658 g. of a reddish-colored, viscous residue having a hydroxyl number of 189, a viscosity of 3,200 cps. at 25° C., an average molecular weight of 455 and a chlorine content of 27.9 percent.

Example 2

To a 2-liter glass kettle equipped as described above except for the addition of a dropping funnel was charged a mixture of 541 g. (6.0 moles) of 1,3-butanediol, 82 g. (2.05 moles) of sodium hydroxide pellets in 92 g. of water, and 200 ml. of toluene. After removal of water from the mixture as described above, the temperature was maintained at 75–80° C. while 261 g. (1.0 mole) of hexachlorobutadiene was introduced dropwise over a period of about 2 hours. Following completion of the feed, the charge was cooked-out for 4 hours at 80° C. to ensure complete reaction. Filtration of the reaction mixture followed by stripping under reduced pressure left 242 grams of a brown, viscous liquid which contained a small quantity of solids. Solution of the material in acetone followed by filtration to remove this solid (sodium chloride) and restripping to remove acetone left 230 grams of a viscous liquid residue which exhibited a hydroxyl number of 233, a viscosity of 332,000 cps. at 25° C., an average molecular weight of 533 and a chlorine content of 27.9 percent. Analysis of the strippings showed that 88 g. of hexachlorobutadiene had been recovered, thus indicating a conversion of 66 percent.

Example 3

To a 3-liter glass kettle equipped as described in Example 1 was charged a mixture of 1000 g. of Polyol A (an alkylene oxide adduct of α-methylglucoside having a hydroxyl number of 436), 41 g. of sodium hydroxide pellets in 51 g. of water and 500 ml. of toluene. After the azeotropic removal of water as described above, the charge was cooled to 60° C. and held at 58–62° C. while hexachlorobutadiene (261 g., 1.0 mole) was introduced dropwise over a period of 20 minutes. Following an additional 1.5 hours at 60° C. the charge was heated to 75° C. and then allowed to cool slowly. The crude reaction mixture was stripped free of toluene and then of unreacted hexachlorobutadiene, finishing at a kettle temperature of 125° C. and a pressure of 1.0 mm. The viscous residue was then diluted with acetone, filtered to remove sodium chloride and restripped to yield 1069 g. of a dark brown, viscous residue having a hydroxyl number of 349, a viscosity of 158,000 cps. at 25° C., an average molecular weight of 585 and a chlorine content of 8.5 percent. The recovered hexachlorobutadiene amounted to 86 g., for an indicated conversion of 67 percent.

Example 4

As described in Example 1, 849 g. (8.0 moles) of diethylene glycol, 82 g. (2.05 moles) of caustic pellets in 92 gm. of water, and 400 ml. of toluene were heated at 80–90° C. under 300–400 mm. pressure while water was azeotropically removed from the reaction mixture. At 25° C., hexachlorobutadiene (261 g., 1.0 mole) was added in one portion to the resulting mixture and the temperature was raised slowly to 50° C. By cooling and heating as required, the temperature was maintained at 50±2° for 4½ hours after which the mixture was stripped free of toluene and then diethylene glycol and excess hexachlorobutadiene to a kettle temperature of 125° C. at 0.8 mm. pressure. Workup of the residue as described in previous examples yielded 271 g. of a dark brown, viscous residue product having a hydroxyl number of 259, and an average molecular weight of 437, a viscosity of 16,500 cps. at 25° C., and a chlorine content of 22.8 percent. Based upon analysis of the strippings for excess hexachlorobutadiene, the conversion of the latter was approximately 70 percent.

Example 5

In the manner described in previous examples, an alkoxide solution was prepared by removing water azeotropically with toluene from a mixture of 1610 g. (12.0 moles) of dipropylene glycol and 82 g. (2.05 moles) of sodium hydroxide in 92 g. of water. The resulting solution was heated to 125° C. and maintained at 125–130° C. both while hexachlorobutadiene (261 g., 1.0 mole) was introduced over a period of 1½ hours and while the charge was subsequently "cooked-out" for two hours. Workup in the general manner described in previous examples afforded 308 g. of a reddish-brown viscous liquid having a hydroxyl number of 296, a viscosity of 33,000 cps. at 25° C., an average molecular weight of 518 and a chlorine content of 13.8 percent. Analysis of the strippings for hexachlorobutadiene indicated that 149 g. had been reacted, for an overall conversion of 57 percent.

Example 6

In the manner described in previous examples, a sodium alkoxide solution was prepared from a mixture of 2000 gm. of Polyol B and 123 gm. of sodium hydroxide. To the alkoxide solution was added at room temperature 783 gm. (3.0 moles) of hexachlorobutadiene and heating was begun. At about 55° C., the reaction began as evidenced by salt formation. The exotherm was permitted to carry the charge to 70° C. after which cooling and later, heating, was required to maintain this temperature for five hours. Following completion of the reaction period the charge was stripped at reduced pressure to a final temperature of 140° C. and a final pressure of about 1 mm. In this way there was recovered a total of 283 g. of hexachlorobutadiene, thus indicating a conversion of 63.8 percent. The stripping residue was diluted with acetone, filtered to remove sodium chloride and restripped to afford 2271 g. of a dark brown residue product polyol having an hydroxyl number of 298, a viscosity of 31,000 cps. at 25° C., and a chlorine content of 12.0 percent and an average molecular weight of 777.

Example 7

As described in earlier examples, an alkoxide solution derived from 6048 g. of Polyol C and 325 g. (8.12 m.) of sodium hydroxide was condensed with hexachlorobutadiene by feeding the latter (2120 g., 8.12 moles) into the mixture dropwise over a 2¾ hour period at a temperature of 80–85° C. Cookout of the charge followed by workup as described in previous examples yielded 6,408 g. of dark brown residue product having a hydroxyl number of 329, a viscosity of 820,000 cps. at 25° C., and an average molecular weight of 1055. A total of 1060 g. of hexachlorobutadiene was recovered from the stripping operation, thereby indicating the conversion to be 50 percent.

Evaluation of polyols from hexachlorobutadiene as flame retardants for rigid urethane foams The polyols of this invention were evaluated for utility as functional flame retardants by utilizing them as components either of the polyol side of the foam system or in the form of quasi-prepolymers with commercial isocyanates. All foams described herein were perpared by the "one-shot" technique using trichlorofluoromethane as the blowing agent for the foam. In all cases, the activators (i.e., the isocyanates or the quasi-prepolymers) were utilized in 5% excess of the stoichiometric requirements. In general, fluorocarbon levels were chosen to produce foams having densities in the range of 1.8–2.2 p.c.f. All foams were oven-cured at 70° C. for 10 minutes and were aged for 3 days prior to testing.

The test procedures used in these evaluations are all currently accepted methods. Core density was determined by ASTM D-1622, apparent closed-cell content by ASTM D-1940-62, compressive strength perpendicular and parallel to foam use by ASTM C273, durability under conditions of cold aging, dry aging and humid aging, respectively by ASTM D-2126B, 2126E and 2126F, and flammability by ASTM D-1692.

Example 8
Experimental formulation

| Component: | Parts |
|---|---|
| Polyol D | 71 |
| Example 5 polyol | 10 |
| Trimethylolpropane | 9 |
| Phosphorus Polyol A | 10 |
| Tris(2-chloroethyl)-phosphate | 5 |
| Tin Catalyst A[2] | 1.2 |
| Trichlorofluoromethane | 27 |
| Isocyanate B | 100.2 |

Control formulation

| Component: | Parts |
|---|---|
| Polyol B | 71 |
| Trimethylolpropane | 9 |
| Phosphorus Polyol A | 20 |
| Tris(2-chloroethyl)-phosphate | 5 |
| Tin Catalyst[2] | 1.2 |
| Trichlorofluoromethane | 27 |
| Isocyanate B | 99.6 |

[1] Parts are expressed as parts, by weight, per hundred parts of polyol.
[2] A solution of T-52N (a tin catalyst sold by Carlisle Chem. Co., not otherwise identified) in LHT-240 which is a mixed ethylene-propylene oxide adduct of 1,2,6-hexanetriol.

The above formulations produced cream, rise, and tack-free times of 35, 118 and 90 seconds, respectively, for the experimental formulation and 30, 110 and 90 seconds, respectively, for the control. The densities were 2.18 and 2.19 p.c.f., respectively. The ASTM D-1692 flammability test showed the experimental formulation to yield a foam rating "non-burning," with an average burning extent of 0.7 inch. The control formulation, on the other hand, produced a foam which burned 1.0 inches on the average, thus placing it in the "self-extinguishing" class. In other physical properties tested, these two foams were essentially equivalent in performance.

Example 9
Experimental formulation

| Component: | Parts |
|---|---|
| Polyol D | 80 |
| Phosphorus Polyol B | 10 |
| Example 5 polyol | 10 |
| Tin Catalyst A | 1.2 |
| Trichloromonofluoromethane | 27 |
| Isocyanate B | 81 |

Control formulation

| Component: | Parts |
|---|---|
| Polyol D | 80 |
| Phosphorus Polyol B | 16 |
| Phosphorus Polyol C | 4 |
| Tin Catalyst A | 1.2 |
| Tricholormonofluoromethane | 27 |
| Isocyanate B | 83 |

The above formulations produced foams having cream, rise and tack-free times of 70, 220, and 180 sceonds for the experimental formulation, and 70, 200 and 180 seconds for the control formulation. The densities of the two foams were 2.14 and 2.20 p.c.f., respectively. The two foams were virtually identical in all tested properties, including flammability by ASTM D-1692. Thus the experimental polyol (10 parts) containing the halogen was approximately equal in fire-retardant characteristics to an equal amount of the phosphorus-containing polyols B and C. The overall phosphorus content of the control foam was 0.97 percent, whereas the phosphorus content of the experimental foam was 0.53 percent and the chlorine content 0.64 percent.

Example 10

The utility of the compositions of this invention as prepolymer intermediates is illustrated in this example, as follows:

To a 500-ml. glass kettle equipped with a stirrer, thermometer, feed funnel and nitrogen gas inlet was charged 188.1 g. of commercial tolylene diisocyanate (80/20 mixture of 2,4- and 2,6-isomers). Under a blanket of nitrogen gas the charge was heated to 75° C. and maintained at 75–80° C. while 111.9 g. of the polyol of Example 1 above, was fed in over a period of 30 minutes. Upon completion of the addition, the mixture was "cooked-out" at 75° C. for an additional 1.5 hours. The light reddish-colored residue product was found by analysis to have an equivalent weight of 166.4, a free "NCO" content of 25.2 percent and a viscosity of 430 cps. at 25° C.

The above quasi-prepolymer was evaluated in the following rigid foam formulation:

| Component: | Parts |
| --- | --- |
| Polyol C | 80 |
| Phosphorus Polyol D | 20 |
| Trichlorofluoromethane | 34 |
| 1,4-Diazabicyclo[2.2.2]octane (33%) | 1.5 |
| Surfactant A | 1.5 |
| Quasi-Prepolymer of this example | 64.4 |
| Polyisocyanate A | 64.6 |

The above formulation produced a light brown non-friable foam, the system showing a cream time of 35 seconds, a rise time of 238 seconds and a tack-free time of 250 seconds. At a density of 1.94 p.c.f., the foam exhibited an ASTM D-1692 burning extent of 1.5 inches, placing it in the "self-extinguishing category."

Example 11

Experimental formulation

| Component: | Parts |
| --- | --- |
| Polyol of Example 3 | 80 |
| Phosphorus Polyol D (Hydroxyl number 444) | 12 |
| Trimethylolpropane | 8 |
| Dibutyltin Dilaurate | 0.5 |
| N,N,N',N'-Tetramethyl-1.3-butanediamine | 0.3 |
| Trichlorofluoromethane | 34 |
| Polyisocyanate B | 112 |

Control formulation

| Component: | Parts |
| --- | --- |
| Polyol A | 85 |
| Phosphorus Polyol D (Hydroxyl number 439) | 15 |
| Dibutyltin Dilaurate | 0.5 |
| N,N,N',N'-Tetramethyl-1,3-butanediamine | 0.3 |
| Trichlorofluoromethane | 34 |
| Polyisocyanate B | 110 |

The above formulations showed cream, rise and tack-free times of 50, 188, and 150 seconds for the control formulation and 35, 118 and 85 seconds for the experimental formulation. Both foams had good cell size, contained 91% closed cells, and exhibited no friability. The control formulation produced a 1.86 pounds per cubic foot foam which rated "self-extinguishing" by ASTM D-1692, with an average burning extent of 1.30 inches. The experimental formulation produced a 1.88 p.c.f. density foam which rated as "non-burning" by ASTM D-1692, exhibiting an average burning extent of 0.4 inch. The control formulation contained 0.73 percent phosphorus on a foam basis, whereas the experimental formulation contained 0.59 percent phosphorus and 2.8 percent chlorine. These results again demonstrate the synergistic effects of phosphorus and chlorine on flammability retardance. In addition, the foam derived from the experimental formulation showed only 16 percent volume increase after 7 days of humid aging at 70° C., 100% RH. whereas the control foam showed a 24 percent increase.

Example 12

Experimental formulation

| Component: | Parts |
| --- | --- |
| Polyol of Example 6 | 75 |
| Trimethylolpropane | 25 |
| Trichlorofluoromethane | 40 |
| N,N,N',N'-Tetramethyl-1,3-butanediamine | 0.35 |
| Diazabicyclo[2.2.2]octane (33%) | 1.2 |
| Quasi-Prepolymer A | 171 |

Control formulation

| Component: | Parts |
| --- | --- |
| Polyol Blend A | 104.8 |
| Trichlorofluoromethane | 40 |
| Quasi-Prepolymer A | 171 |

The above formulations produced light brown, non-friable foams having cream, rise and tack-free times of 20, 158 and 100 seconds for the experimental formulation and 25, 150 and 135 seconds for the control formulation. At densities of 2.04 p.c.f. for the experimental foam and 2.03 p.c.f. for the control foam, the ASTM D-1692 flammability ratings were "non-burning" and "self-extinguishing," respectively, with the experimental foam showing an average burning extent of 0.84 inch and the control foam an average burning extent of 2.47 inches.

Example 13

Experimental formulation

| Component: | Parts |
| --- | --- |
| Polyol of Example 6 | 75 |
| Trimethylol propane (Hydroxyl Number 540) | 25 |
| N,N,N',N'-Tetramethyl-1,3-butanediamine | 0.35 |
| 1,4-Diazabicyclo[2.2.2]octane (33%) | 1.2 |
| Surfactant A | 1.5 |
| Quasi-Prepolymer B | 175 |

Control formulation

| Component: | Parts |
| --- | --- |
| Polyol Blend A | 104.8 |
| Trichlorofluoromethane (Hydroxyl Number 540) | 40 |
| Surfactant A | 1.5 |
| Quasi-Prepolymer B | 174.5 |

The above formulations produced foams of good cell structure at densities of 2.01 p.c.f. for the experimental foam and 2.12 p.c.f. for the control foam. The respective cream, rise and tack-free times were 20, 130 and 90 seconds for the experimental formulation and 25, 196 and 140 seconds for the control formulation. Both foams rated "self-extinguishing" by the ASTM D-1692, but the experimental foam burned only 1.3 inches on the average as opposed to 1.6 inches for the control. The control foam contained 4.9 wt. percent bromine, whereas the experimental foam contained 4.9 percent bromine and 2.8 percent chlorine.

Example 14

In equipment similar to that described in previous examples was charged a mixture of 2400 g. (6.0 m.) of Polyol E, 244 g. (6.1 m.) of sodium hydroxide pellets, 1566 g. (6.0 m.) of hexachlorobutadiene, and 8000 ml. of toluene. The pressure on the system was reduced to 300 mm. Hg and heating was begun. At a temperature of approximately 75° C., the reaction began as evidenced by the appearance of a red color, a strong exotherm and a salt formation. At this point, the heating was discontinued until the exotherm subsided. Throughout this period, water was removed from the toluene-water azeotrope. The reaction was completed by heating at 90° C. until water was no longer produced. The reaction mixture was filtered to remove sodium chloride and the filtrate diluted with acetone and refiltered to remove the last traces of salt. Stripping off the acetone and toluene to a maximum temperature of 80° C. at 5 mm. Hg, following removal of the unreacted hexachlorobutadiene by stripping to 142° C. at 1.5 mm., afforded the halogen-containing polyol (2777 g.) as a dark brown residue product having an hydroxyl number of 382, a viscosity of 7,700 cps. at 25° C., an average molecular weight of 521, and a chlorine content of 13.1 percent. Based on the recovered hexachlorobutadiene, conversion of the latter was 49.7 percent.

What is claimed is:

1. A polyol that comprises the reaction product of:
(a) hexachlorobutadiene, and
(b) the reaction product of a base and a composition having at least two hydroxy groups and a molecular weight weight of not more than about 5000, and which is selected from the group consisting of (1) polyhydroxyalkanes having from 2 to 6 carbon atoms and alkylene oxide adducts of such polyhydroxyalkanes, (2) alkylene oxide adducts of ammonia, (3) alkylene oxide adducts of an alkylenediamine or polyalkylenepolyamine, and said alkylene having from 2 to 3 carbon atoms, and (4) alpha-methylglucoside, alkylene glycolglucoside, sucrose, and alkylene oxide adducts of such glucosides and sucrose, wherein the reaction between (a) and (b) is carried out at a temperature of from about 35° to about 200° C. for a period of time sufficient to neutralize substantially all of said base by formation of the chloride salt thereof, and wherein said alkylene oxides are ethylene oxide, propylene oxide, or butylene oxide.

2. The polyol of claim 1 wherein said base is an alkali metal or an alkali metal hydroxide, wherein from about one to about three equivalents of base is employed per mole of hexachlorobutadiene, wherein said composition having at least two hydroxyl groups is employed in an amount sufficient to provide, prior to reaction of said composition with said base, at least three equivalents of hydroxyl per mole of hexachlorobutadiene, and wherein the reaction between (a) and (b) is carried out at a temperature of from about 45° C. to about 135° C. for from about one to about twenty hours.

3. The polyol of claim 1 wherein said composition having at least two hydroxyl groups is a polyhydroxyalkane, alkylene oxide adduct of a polyhydroxyalkane, trialkanolamine, alkylene oxide adduct of an alkylenediamine or a polyalkylenepolyamine, alkylene oxide adduct of sucrose, or an alkylene oxide adduct of a glycoside.

4. The polyol of claim 1 wherein said base is sodium hydroxide.

5. The polyol of claim 1 wherein said composition having at least two hydroxyl groups is a glycol.

6. The polyol of claim 1 wherein said composition having at least two hydroxyl groups is dipropylene glycol.

7. The polyol of claim 1 wherein said composition having at least two hydroxyl groups is 1,3-butanediol.

8. The polyol of claim 1 wherein said composition having at least two hydroxyl groups is the propylene oxide adduct of alpha-methylglucoside.

9. The polyol of claim 1 wherein said composition having at least two hydroxyl groups is diethylene glycol.

10. The polyol of claim 1 wherein said composition having at least two hydroxyl groups is the propylene oxide adduct of sorbitol.

11. The polyol of claim 1 wherein said composition having at least two hydroxyl groups is the propylene oxide adduct of sucrose.

References Cited

UNITED STATES PATENTS

| | | | |
|---|---|---|---|
| 3,261,819 | 7/1966 | Stogryn et al. | 260—615 |
| 3,261,874 | 7/1966 | Stogryn et al. | 260—615 |
| 3,264,233 | 8/1966 | Trescher et al. | 260—615 |

LEWIS GOTTS, Primary Examiner.

JOHNNIE R. BROWN, Assistant Examiner.

U.S. Cl. X.R.

106—252; 252—8.1, 152, 351, 357; 260—2.5, 77.5, 210, 343, 475, 485, 571, 584, 607, 609, 615, 928, 957